United States Patent [19]
Wambeke et al.

[11] Patent Number: 6,116,614
[45] Date of Patent: Sep. 12, 2000

[54] SEALING MEMBER

[75] Inventors: Alain Wambeke, Zoutleeum, Belgium; Thierry Houdard, Asniere sur Seine, France

[73] Assignee: N.V. Raychem, S.A., Belgium

[21] Appl. No.: 09/029,021

[22] PCT Filed: Aug. 15, 1996

[86] PCT No.: PCT/GB96/01999

§ 371 Date: Apr. 28, 1998

§ 102(e) Date: Apr. 28, 1998

[87] PCT Pub. No.: WO97/08797

PCT Pub. Date: Mar. 6, 1997

[30] Foreign Application Priority Data

Aug. 23, 1995 [GB] United Kingdom .................... 9517202

[51] Int. Cl.[7] ....................................... F16J 15/12
[52] U.S. Cl. .......................... 277/603; 277/619; 277/624; 277/627; 277/633; 277/637; 277/640; 138/149
[58] Field of Search ................................. 277/603, 604, 277/607, 616, 618, 619, 624, 627, 630, 633, 637, 640, 650, 621; 138/149

[56] References Cited

U.S. PATENT DOCUMENTS

| 2,616,736 | 11/1952 | Smith | 277/607 |
|---|---|---|---|
| 3,703,297 | 11/1972 | Gignac | 277/621 |
| 5,290,073 | 3/1994 | Chen | 277/621 |
| 5,340,123 | 8/1994 | Griffiths | 277/621 |

FOREIGN PATENT DOCUMENTS

| 2 649 838 | 1/1991 | France . |
|---|---|---|
| 2012 631 | 9/1971 | Germany . |
| 41 35 570 | 11/1992 | Germany . |
| 1-160311 | 9/1989 | Japan . |
| WO 94/05935 | 3/1994 | WIPO . |
| WO 96/09670 | 3/1996 | WIPO . |

*Primary Examiner*—Anthony Knight
*Assistant Examiner*—Vishal Patel
*Attorney, Agent, or Firm*—Herbert G. Burkard; Myers Bigel Sibley & Sajovec

[57] ABSTRACT

A sealing member is provided which can be spirally wrapped around an elongate article (e.g., a cable) comprises a strip of sealing material (e.g., gel sealing material), and at least one series of gripping elements situated adjacent to the strip of sealing material and extending beside a longitudinal edge of the sealing material. In use, the gripping elements cause the sealing member to grip an elongate article around which it is spirally wrapped. The sealing member may also include a support strip to which the strip of sealing material and each series of gripping elements are attached.

23 Claims, 2 Drawing Sheets

SEALING MEMBER

FIELD OF THE INVENTION

The present invention relates to a sealing member which can be spirally wrapped around an elongate article (e.g. a telecommunications or electrical cable or a pipe), for example to form a seal between the elongate article and a surrounding article (e.g. a cable splice closure casing or a duct). The invention also relates to a kit of parts for forming a cable splice closure, which includes one or more such sealing members.

BACKGROUND OF THE INVENTION

German patent no. 4135570 C1 describes a sealing band for wrapping around a cable passing through a duct, to create a seal between the cable and the duct, in which at least the inside of the band turned towards the cable has a roughened surface, preferably formed from projecting friction elements. The friction elements may be fine-grained corundum or emery, or they may be metal or plastic and anchored in the material of the sealing band.

International patent application WO 94/05935 (Raychem) discloses a sealing member comprising (a) a sealing material having a cone penetration between 80 and 400 ($10^{-1}$ mm) and an ultimate elongation of at least 100%, and (b) an elastomeric retaining member for the sealing material.

SUMMARY OF THE INVENTION

According to the present invention, there is provided a sealing member which can be spirally wrapped around an elongate article, comprising:

(a) a strip of sealing material; and
(b) a series of gripping elements situated adjacent to the strip of sealing material and extending beside a longitudinal edge thereof;

wherein in use the gripping elements cause the sealing member to grip an elongate article around which it is spirally wrapped.

The sealing member according to the invention has the advantage that because it has a series of gripping elements situated adjacent to the strip of sealing material and extending beside a longitudinal edge of the strip of sealing material, rather than being embedded or anchored in the sealing material (as is the case with the sealing band of DE 4135570 C1), the sealing effectiveness of the sealing material is normally not impaired by the gripping elements.

The sealing member preferably further comprises a second series of gripping elements situated adjacent to the strip of sealing material and extending beside a longitudinal edge thereof opposite the edge beside which the said series of gripping elements extends. This has the advantage of enabling the sealing member to grip an elongate article, around which it is spirally wrapped, on both axial sides of the spirally wrapped strip of sealing material, which can aid in the retention of the sealing material in place around the elongate article.

According to preferred embodiments of the invention, the sealing member further comprises a support strip to which the strip of sealing material and/or the or each series of gripping elements is/are attached. Advantageously, the support strip may comprise a single piece of polymeric, preferably elastomeric, material, e.g. natural or synthetic rubber. Additionally or alternatively, the support strip may comprise a plurality of fibres, strands, wires or the like, particularly in the form of a woven or a non-woven fabric, e.g. formed from polyamide, polyolefin, polyester, glass and/or metal.

The support strip may advantageously be resiliently stretchable. This can have the advantage of enabling a compressive force to be applied to the sealing material by the support strip once it has been stretched (i.e. such that it exerts an opposing retractive force).

The support strip (and preferably also the sealing material together with the support strip) may advantageously be pre-stretched in the longitudinal and/or transverse direction. Preferably such pre-stretching causes an opposing retractive (and therefore compressive) force to be applied to the sealing material. In use, a pre-stretched sealing member will normally attempt to contract, thereby applying compression to the sealing material. This is often advantageous, since some sealing materials, notably gels and mastics, usually perform best when they are put under compression. It is particularly preferred for the sealing member to be pre-stretched in the longitudinal direction, causing the sealing member to attempt to unravel during use. Any attempted contraction (e.g. by unravelling) of the sealing member is preferably substantially prevented by its containment in a casing, a duct, or the like. By "pre-stretched" is meant stretched as, or before the sealing member is wrapped around an elongate article. In some embodiments of the invention, the support strip may even be pre-stretched before the sealing material is attached to the support strip.

Each gripping element of the series of gripping elements is preferably independently attached to the support strip (where present). Additionally or alternatively, each gripping element is preferably attached to the support strip by mechanically interlocking with it, e.g. by one or more projections or other parts on the gripping elements or support strip interlocking with one or more holes or recesses in the support strip or gripping elements. One particularly preferred design has one or more series of holes or recesses extending along the support strip, with which the gripping elements interlock. Another particularly preferred design has each gripping element carried on (e.g. clipped on) one or more strands, fibres or wires of the support strip, e.g. by simple mechanical interlocking.

Preferably, each gripping element is profiled such that, when the sealing member is spirally wrapped around an elongate article in use, gripping elements of successive wrappings interlock with each other, thereby substantially preventing accidental displacement of the wrappings with respect to each other axially along the elongate article. Additionally or alternatively, the gripping elements may be sufficiently spaced apart along the sealing member so that, when the sealing member is wrapped, gripping elements of successive windings fit between each other. The gripping elements are preferably provided with teeth or other gripping protrusions. Each gripping element may advantageously be formed from a rigid plastics material or a metal, for example.

According to particularly preferred embodiments of the invention, the sealing member further comprises retaining means which in use at least contribute(s) to retaining the sealing material on the sealing member in the axial direction with respect to an elongate article around which the sealing member is spirally wrapped. The retaining means may comprise, or may be part of, the gripping elements. Preferably however, the retaining means comprise(s) one or more additional parts of the sealing member. Preferably the retaining means is/are attached to, or an integral part of, the support strip (where present).

Advantageously, the retaining means may comprise a first retaining strip extending next to a longitudinal edge of the strip of sealing material. Preferably, the retaining means further comprise a second retaining strip extending next to a longitudinal edge of the strip of sealing material opposite the edge next to which the first retaining strip extends. More preferably, the first and/or the second retaining strip is/are each situated between the strip of sealing material and the/a series of gripping elements.

The or each retaining means is preferably resiliently compressible, e.g. being formed from an elastomeric and/or foamed polymeric material. This has the particular advantage that when the sealing member is wrapped around an elongate article and is subjected to a compressive force (e.g. when a cable splice casing or sealing device is closed around it), the retaining means is preferably compressed, and due to its resilience preferably exerts an opposing compressive force upon the sealing material (which itself is preferably substantially incompressible). Some sealing materials (notably gels, e.g. as described in detail below) function best when placed under pressure. However, such sealing materials may be subject to creep or relaxation over a period of time and/or they may change volume due to fluctuations in temperature, for example. The advantage of the retaining means being resiliently compressible is that if, in use, such creep, relaxation, or increase or decrease in volume of the sealing material occurs, the retaining means, which has been compressed, will in response automatically either expand due to its resilience or contract farther due to its compressibility (depending on the circumstances) thereby substantially maintaining the pressure on the sealing material.

The retaining means is/are preferably formed from a polymeric (e.g. silicone, polyolefin, polyurethane) foam material and/or an elastomeric material (e.g. natural or synthetic rubber). The material of the retaining means preferably has a compression set (as determined according to ASTM D395 at 70° C.) of no more than 15%, more preferably no more than 10%, especially no more than 5%.

The particularly preferred embodiments of the invention, i.e. comprising a strip of sealing material, a series of gripping elements, retaining means for the sealing material, and a support strip have the advantage that they combine the following four features, namely: sealing, gripping, retention of sealing material, and storage of potential energy (e.g. by a resiliently compressible retaining means when it is compressed, or by a resiliently-stretchable support strip when it is stretched) which can maintain pressurization of the sealing material. The fact that preferred embodiments of the invention combine all of these features in one article (the sealing member) means that additional components which have conventionally been used to provide such features are not normally necessary, thus simplifying the design and installation of the cable splice closure, duct seal, or whatever.

The sealing material of the sealing member may generally comprise any suitable sealing material. One preferred form of sealing material comprises a mastic, most preferably having a high compression set and minimum creep properties. The mastic preferably comprises one or more substantially non-crystalline materials, e.g. bituminous materials, elastomeric materials, and/or thermoplastic polymers. The mastic may contain one or more fillers or other additives. Examples of mastics which can generally be used as the sealing material of the present invention are disclosed in U.S. Pat. Nos. 3,243,211, 3,297,819, 3,396,460 and 4,206,786. The entire disclosure of each of these patents is incorporated herein by reference. An advantageous property of mastic is that during the formation of a seal, it is normally deformable and generally able to flow easily, but after some time it is normally stable, and may have a high mechanical strength. Preferably the mastic has a softening point (when measured according to ASTM E28) of about 130° C., and when subjected to a rolling drum peel test at 23° C. (according to test QAPK 027) preferably has a peel strength of about 130N/25mm. A preferred mastic has a sheer strength (when tested according to ISO04587) of greater than 160N preferably greater than 250N. Mastics preferred for this invention have high, generally 100%, compression set.

It is particularly preferred that the sealing material may additionally or alternatively comprise gel. The gel may, for example, comprise silicone gel, urea gel, urethane gel, thermoplastic gel, or any suitable gel or gelloid sealing material. Preferred gels comprise an oil-extended polymer composition. Preferably the gel has a hardness at room temperature as determined using a Stevens-Volland Texture Analyser of greater than 45 g, particularly greater than 50 g, especially greater than 55 g, e.g. between 55 g and 60 g. It preferably has a stress-relaxation of less than 12%, particularly less than 10% and especially less than 8%. Ultimate elongation, also at room temperature, is preferably greater than 100%, more preferably greater than 600%, especially greater than 1000%, particularly greater than 1400%, as determined according to ASTM D638. Tensile modulus at 100% strain is preferably at least 1.8 MPa more preferably at least 2.2 MPa. In general compression set (as measured according to ASTM D395 at 70°) is preferably less than 35%, more preferably less than 25%, especially less than 15%. Preferably, the gel has a cone penetration as measured by ASTM D217 of at least 50 ($10^{-1}$ mm), more preferably at least 100 ($10^{-1}$ mm), even more preferably at least 200 ($10^{-1}$ mm) and preferably no greater than 400 ($10^{-1}$ mm), especially no greater than 350 ($10^{-1}$ mm). The polymer composition of the gel may for example comprise an elastomer, or a block copolymer having relatively hard blocks and relatively elastomeric blocks. Examples of such copolymers include styrene-diene block copolymers, for example styrene-butadiene or styrene-isoprene diblock or triblock copolymers e.g. as disclosed in international patent publication number WO 88/00603. Preferably, however, the polymer composition comprises one or more styrene-ethylene-propylene-styrene block copolymers, for example as sold under the Trade Mark 'Septon' by Kuraray of Japan. The extender liquids employed in the gel preferably comprise oils. The oils may be hydrocarbon oils, for example paraffinic or napthenic oils, synthetic oils for example polybutene or polypropene oils, and mixtures thereof. The preferred oils are mixtures of non-aromatic paraffins and naphthenic hydrocarbon oils. The gel may contain additives, e.g. such as moisture scavengers (e.g. Benzoyl chloride), antioxidants, pigments and fungicides.

Gels are preferred because they are often excellent sealing materials, partly due to their ability to wet surfaces with which they come into contact, and partly due to their other physical and chemical properties. However, some or all of the preferred physical properties of gels may be present in sealing materials other than gels. One of the preferred properties of the sealing material is that it has a Stevens Volland hardness of 45 g to 130 g, more preferably 50 g to 70 g. Another preferred property of the sealing material is that it has a cone penetration as measured by ASTM D217 of at least 50 ($10^{-1}$ mm), more preferably at least 100 ($10^{-1}$ mm), even more preferably at least 200 ($10^{-1}$ mm), and preferably no greater than 400 ($10^{-1}$ mm), especially no greater than 350 ($10^{-1}$ mm).

Other sealing materials which can be used include polymeric (e.g. silicone) foam materials, elastomeric materials, e.g. natural or synthetic rubber, adhesives, especially pressure sensitive adhesives, curable/reactive sealing materials or grease, e.g. silicone grease.

It was mentioned above that, in addition to a sealing member, the invention also relates to a kit of parts for forming a cable splice closure. Accordingly, a third aspect of the invention provides a kit of parts for forming a cable splice closure, comprising: (a) one or more sealing member(s) according to the invention; and (b) a casing to enclose the cable splice and preferably also the or each sealing member when spirally wrapped around one or more of the spliced cables.

Preferably, in use, the or each sealing member is wrapped around one or more cables and/or placed between two or more cables (the latter being to form a branch-out, for example) and the casing is closed around the cable(s) and sealing member(s). Advantageously, closing the casing and/or one or more other parts of the kit, e.g. one or more sealing devices, may compress the sealing material and/or the retaining means (where present) and/or cause the gripping elements (where present) to grip the cable(s).

BRIEF DESCRIPTION OF THE DRAWINGS

The invention will now be described, by way of example, with reference to the accompanying drawings, of which.

DETAILED DESCRIPTION OF THE ILLUSTRATED EMBODIMENTS

Figure 1:
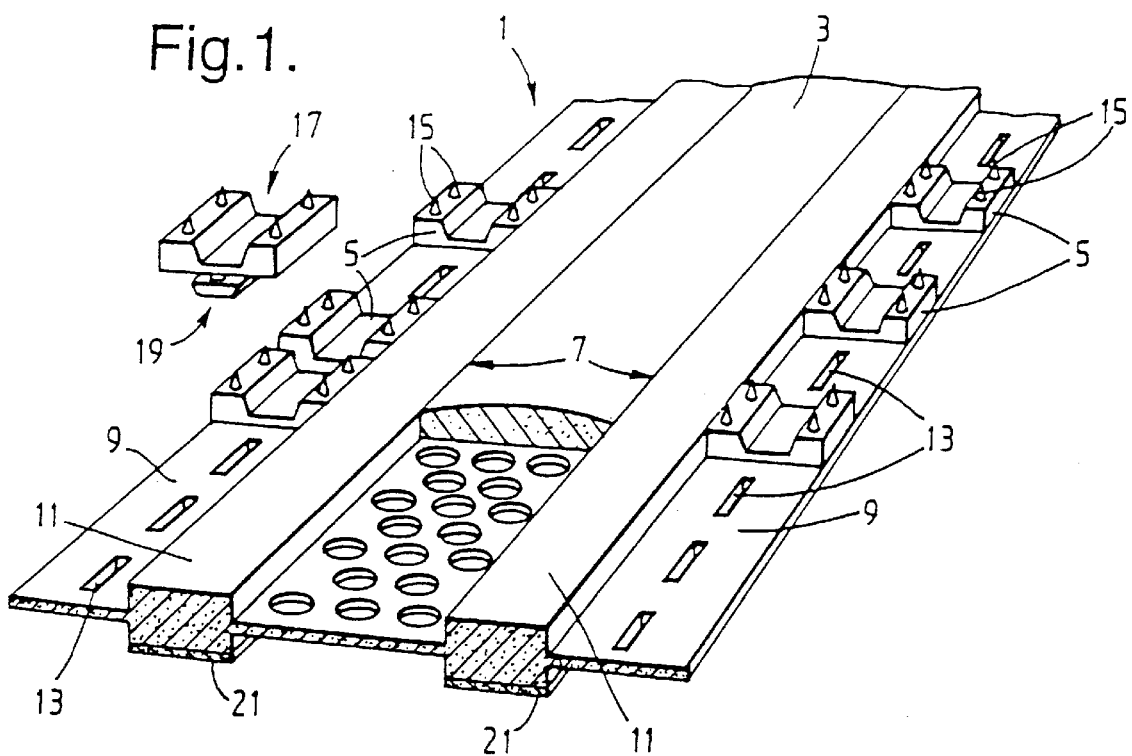
FIG. 1 shows, in perspective, one preferred form of sealing member according to the invention.
Figure 2:
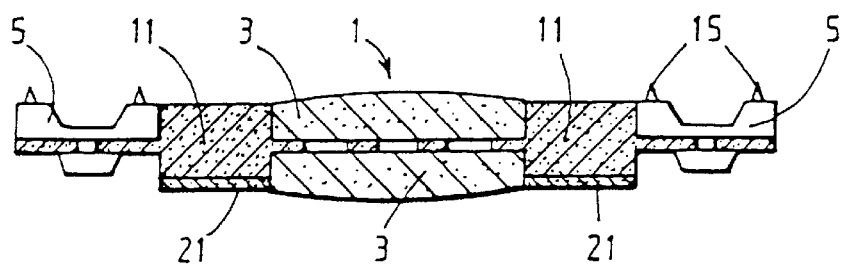
FIG. 2 shows the sealing member of FIG. 1 in cross-section.

FIGS. 1 and 2 show a sealing member 1 according to the invention, comprising a strip of sealing material 3 (e.g. gel) and two series of gripping elements 5, each situated adjacent to the strip of sealing material 3 and extending beside opposite longitudinal edges 7 thereof. Both the strip of sealing material 3 and the gripping elements 5 are attached to a support strip 9, comprising a single strip of elastomeric material (e.g. rubber). Between the strip of sealing material 3 and each series of gripping elements 5 is a retaining means in the form of a retaining strip 11 which, in use, retains the sealing material 3 in the transverse direction with respect to the strip (i.e. the axial direction with respect to a cable or other elongate article around which the strip may be wrapped). Each retaining strip 11 is an integral part of the support strip 9, but this need not always be the case. Each retaining strip 11 is resiliently compressible, and, as drawn, also has an additional resiliently compressible layer 21, e.g. formed from rubber or polymeric foam material.

Extending longitudinally along the support strip 9, near each transverse edge of the strip, is a series of holes 13, into each, or some, of which, part of a respective gripping element 5 is inserted, such that the gripping element mechanically interlocks with the support strip 9. Each gripping element has teeth or other gripping protrusions 15, to aid in gripping a cable or other elongate article. Each gripping element is also profiled on opposite faces 17, 19, thereof, so that, when the sealing member is spirally wrapped around an elongate article in use, gripping elements 15 of successive wrappings or turns interlock with each other, thereby substantially preventing accidental displacement of the wrappings with respect to each other axially along the elongate article.

Figure 3:
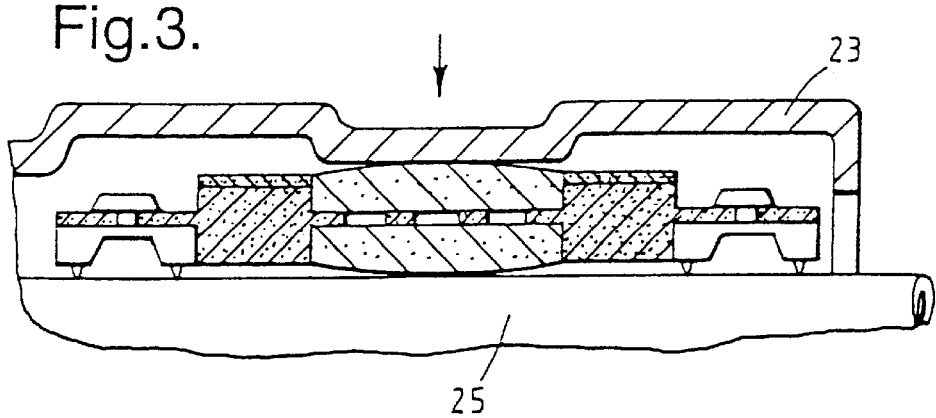
FIG. 3 shows, schematically and in cross-section, part of a cable splice closure, assembled from a kit according to the invention, being installed around a cable splice.

FIG. 3 shows, schematically and in cross-section, part of a cable splice closure casing 23 being installed around a cable 25 which has the sealing member 1 of FIGS. 1 and 2 wrapped around it. For clarity, only one wrapping of the sealing member 1 is illustrated, but ordinarily the sealing member would be wrapped two or more times around the cable. The arrow illustrates that the casing 23 is being closed around the cable 25 and the sealing member 1, which will cause the sealing material strip 3 of the sealing member to be put under compression. The retaining strips 11 of the sealing member will be compressed by some axial expansion of the sealing material 3 caused by its radial compression, but will nonetheless substantially retain the sealing material in the axial directions. As explained above, because the retaining strips 11 are resilient, any expansion or contraction of the sealing material 3 will normally be balanced by a corresponding contraction or expansion of the retaining strips. Closing the casing 23 will also force the gripping elements 5 into gripping contact with the cable 25, securing the sealing member 1 to the cable, and because the casing is profiled to interlock with the sealing member, indirectly securing the cable to the casing.

Figure 4:
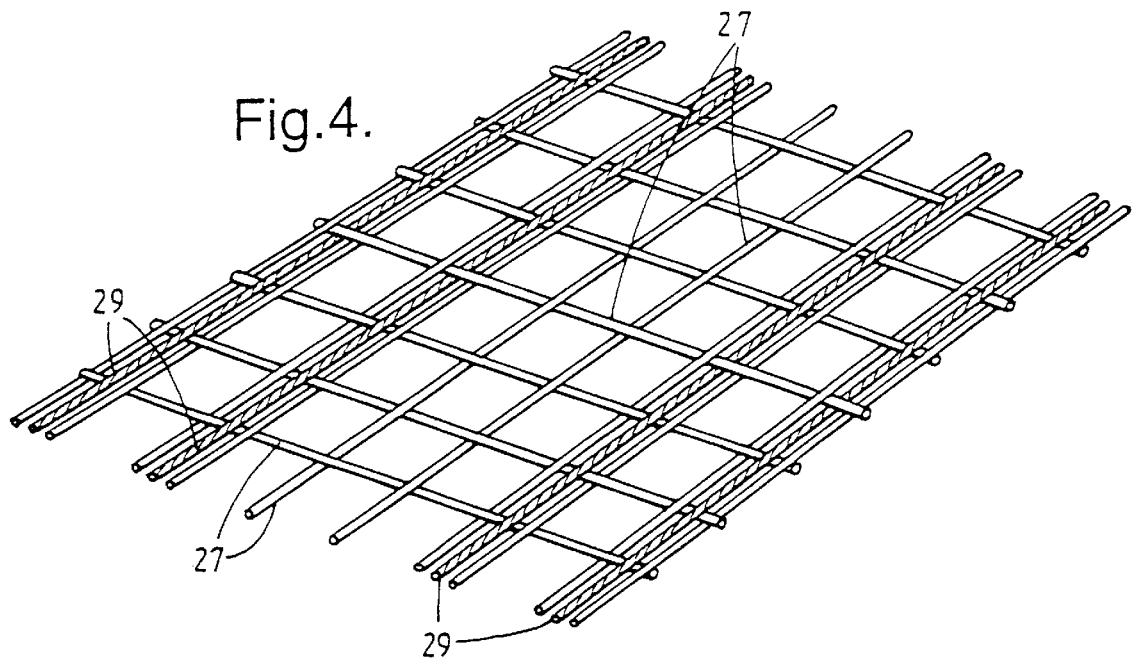
FIG. 4 shows, in perspective, a support strip of another preferred form of a sealing member according to the invention.

FIG. 4 shows, in perspective, a support strip of another form of sealing member according to the invention. This support strip comprises a loose weave of elastomeric fibres 27, with interwoven longitudinal reinforcement members 29. The elastomeric fibres are preferably formed from polybutadiene, and the reinforcement members 29 preferably comprise polyamide, polypropylene, polyethylene, polyester, or glass fibres, or metal (e.g. aluminium or copper) wires.

Figure 5:
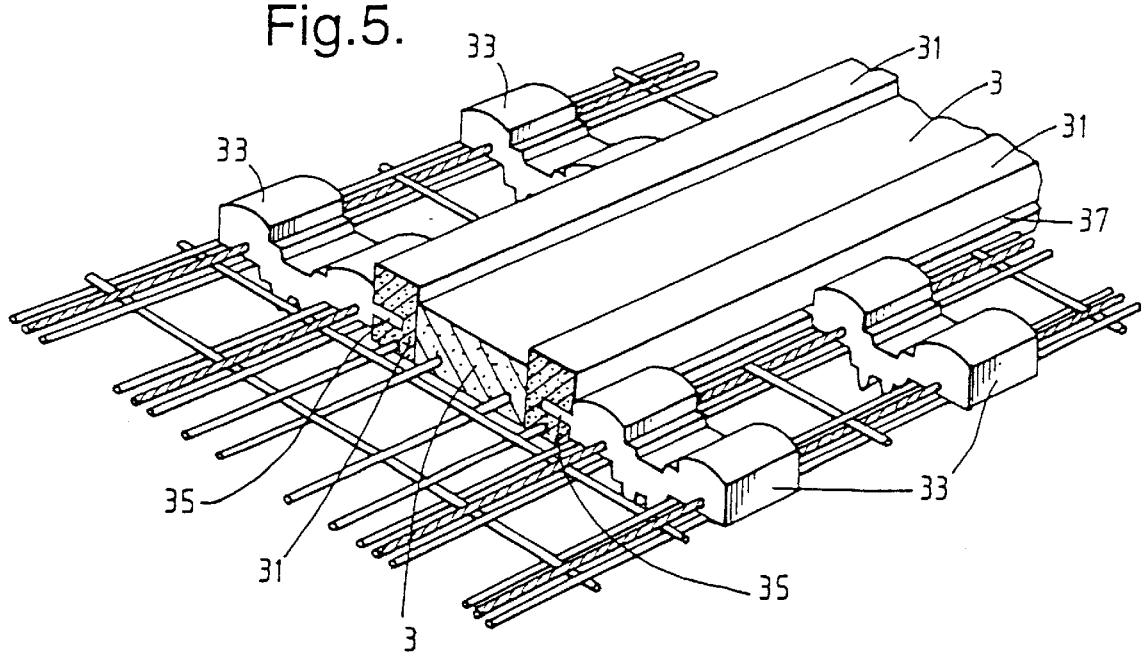
FIG. 5 shows, in perspective, a complete sealing member of which the support strip shown in FIG. 4 is a part.

FIG. 5 shows, in perspective, a complete sealing member of which the support strip shown in FIG. 4 forms a part. The sealing member comprises a strip of sealing material 3 (e.g. gel) carried by some of the elastomeric fibres 27 of the support strip. The sealing material 3 may advantageously be extruded onto the elastomeric fibres 27. Next to either longitudinal edge of the strip of sealing material 3 is a retaining strip 31, preferably formed from polymeric (e.g. polyethylene) foam. Each retaining strip 31 is carried by some of the elastomeric fibres 27. Next to each retaining strip 31, on the opposite side of the retaining strip from the sealing material 3, extends a series of gripping elements 33. The gripping elements 33 are carried by (e.g. clipped on) the reinforcement members 29. For extra securement, a part 35 of each gripping element also extends into a groove 37 into its respective retaining strip 31.

In the drawings and specification, there have been disclosed typical preferred embodiments of the invention and, although specific terms are employed, they are used in a generic descriptive sense only and not for purposes of limitation, the scope of the invention being set forth in the following claims.

We claim:

1. A sealing member which can be spirally wrapped around an elongate article, comprising:

(a) a strip of sealing material; and (b) a first gripping element situated adjacent to the strip of sealing material and beside a longitudinal edge thereof;

wherein in use the gripping element causes the sealing member to grip an elongate article around which it is spirally wrapped.

2. A sealing member according to claim 1, further comprising a second gripping element situated adjacent to the strip of sealing material and beside a longitudinal edge thereof opposite the edge beside which the first gripping element is located.

3. A sealing member according to claim 1, further comprising a support strip to which at least one of the strip of sealing material or the gripping element is attached.

4. A sealing member according to claim 3, in which the support strip is resiliently stretchable.

5. A sealing member according to claim 4, in which the support strip is pre-stretched in at least one of a longitudinal or a transverse direction thereof.

6. A sealing member according to claim 4, in which the support strip comprises a single piece of polymeric material.

7. A sealing member according to claim 3, in which the support strip comprises a fabric.

8. A sealing member according to claim 3 further comprising at least one additional gripping element providing with said first gripping element a series of gripping elements extending beside the longitudinal edge of the strip of sealing material and wherein each gripping element of the series of gripping elements is independently attached to the support strip.

9. A sealing member according to claim 8, in which each gripping element of the series of gripping elements is mechanically interlockeded to the support strip.

10. A sealing member according to claim 8, in which each gripping element of the series of gripping elements is configured to interlock with another gripping element when the sealing member is spirally wrapped around an elongate article in use.

11. A sealing member according to claim 8, in which each gripping element is formed of a material selected from the group consisting of rigid plastics and metal.

12. A sealing member according to claim 1, further comprising retaining means for retaining the sealing material on the sealing member in the axial direction with respect to an elongate article around which the sealing member is spirally wrapped.

13. A sealing member according to claim 12, in which the retaining means comprises a first retaining strip extending next to a longitudinal edge of the strip of sealing material.

14. A sealing member according to claim 13, in which the retaining means farther comprises a second retaining strip extending next to a longitudinal edge of the strip of sealing material opposite the edge next to which the first retaining strip extends.

15. A sealing member according to claim 13 in which the first retaining strip is situated between the strip of sealing material and the gripping element.

16. A sealing member according to claim 12 in which the retaining means is resiliently compressible.

17. A sealing member according to claim 16, in which the retaining means is formed from a material selected from the group consisting of an elastomers and foamed polymers.

18. A sealing member according claim 12 further comprising a support strip to which at least one of the strip of sealing material or the gripping element is attached and wherein the retaining means is integrally connected to the support strip.

19. A sealing member according to claim 1, in which the sealing material is selected from the group consisting of gel, mastic and adhesive.

20. A sealing member according to claim 19, in which the sealing material has a Stevens Volland hardness of 45 g to 130 g.

21. A kit of parts for forming a cable splice closure, comprising:
   a sealing member which can be spirally wrapped around an elongate article, said sealing member comprising:
   (a) a strip of material; and
   (b) a first gripping element situated adjacent to the strip of sealing material and beside a longitudinal edge thereof;
   wherein in use the gripping element causes the sealing member to grip an elongate article around which it is spirally wrapped; and
   a casing to enclose the cable splice.

22. A sealing member according to claim 10 wherein spirally wrapping the sealing member around an elongate article in use substantially prevents accidental displacement of wrappings of the spirally wrapped sealing member with respect to each other axially along the elongate article.

23. A sealing member according to claim 1 further comprising at least one additional gripping element providing with said first gripping element a series of gripping elements extending beside the longitudinal edge of the strip of sealing material.

* * * * *